US008024498B2

(12) United States Patent
Allen et al.

(10) Patent No.: US 8,024,498 B2
(45) Date of Patent: Sep. 20, 2011

(54) TRANSITIONS BETWEEN ORDERED AND AD HOC I/O REQUEST QUEUEING

(75) Inventors: James P. Allen, Austin, TX (US); Nicholas S. Ham, Austin, TX (US); John L. Neemidge, Round Rock, TX (US); Stephen M. Tee, Marble Falls, TX (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/335,307

(22) Filed: Dec. 15, 2008

(65) Prior Publication Data

US 2010/0153593 A1 Jun. 17, 2010

(51) Int. Cl.
*G06F 3/00* (2006.01)
*G06F 13/00* (2006.01)

(52) U.S. Cl. ............ 710/39; 710/5; 710/6; 710/33; 710/52; 710/57

(58) Field of Classification Search .................. None
See application file for complete search history.

(56) References Cited

U.S. PATENT DOCUMENTS

| 6,842,792 | B2 | 1/2005 | Johnson et al. |
| 6,952,734 | B1 | 10/2005 | Gunlock et al. |
| 7,159,071 | B2 | 1/2007 | Ikeuchi et al. |
| 7,162,550 | B2 | 1/2007 | Douglas |
| 7,363,399 | B2 | 4/2008 | Shum et al. |
| 2002/0091882 | A1 | 7/2002 | Espeseth et al. |
| 2004/0081108 | A1* | 4/2004 | Kloth et al. ............ 370/299 |
| 2004/0194095 | A1 | 9/2004 | Lumb et al. |
| 2006/0064520 | A1 | 3/2006 | Anand et al. |
| 2006/0112301 | A1 | 5/2006 | Wong |
| 2006/0292292 | A1* | 12/2006 | Brightman et al. ......... 427/66 |
| 2007/0198750 | A1 | 8/2007 | Moilanen |
| 2007/0208849 | A1 | 9/2007 | Ely et al. |

OTHER PUBLICATIONS

Mischael, Jim, A Priority Queue Implementation in C#, Jun. 21$^{st}$, 2007, www.devsource.com [online, accessed on Jan. 15, 2011], URL: http://www.devsource.com/c/a/Languages/A-Priority-Queue-Implementation-in-C/.*
Title: Efficient and Adaptive Proportional Share I/O Scheduling Author: Gulatti et al. Source: HP Information Services and Process Innovation Laboratory Date: 2007.

* cited by examiner

*Primary Examiner* — Tariq Hafiz
*Assistant Examiner* — Scott Sun
(74) *Attorney, Agent, or Firm* — Robert C. Rolnik; Libby Z. Toub

(57) ABSTRACT

Disclosed is a computer implemented method and apparatus for queuing I/O requests to a pending queue. The I/O device driver sets a maximum ordered queue length for an I/O device driver coupled to a storage device then receives an I/O request from an application. The I/O device driver determines whether the pending queue is sorted and responds to a determination that the pending queue is sorted, determining if queued I/O requests exceed the maximum ordered queue length. Responding to a determination that the pending queue exceeds the maximum ordered queue length, the I/O device driver adds the I/O request based on a high pointer, and points the high pointer to the I/O request.

14 Claims, 4 Drawing Sheets

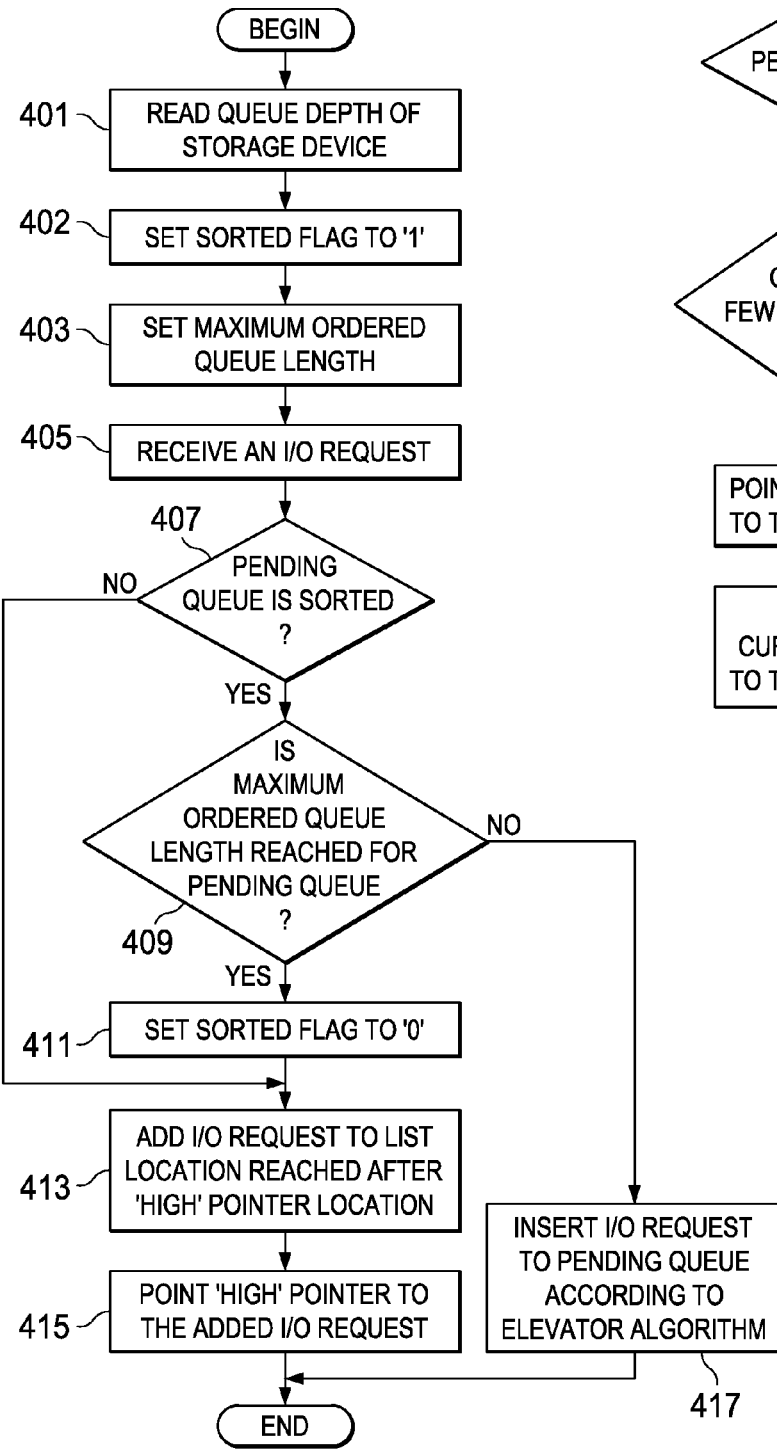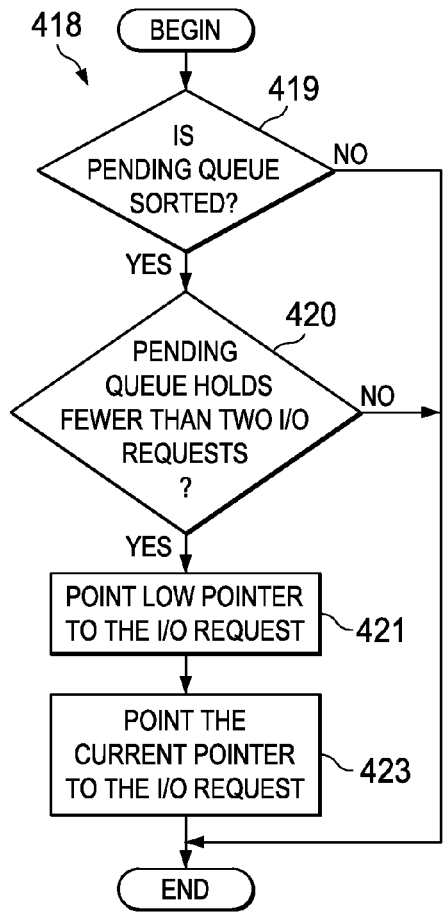

TRANSITIONS BETWEEN ORDERED AND AD HOC I/O REQUEST QUEUEING

BACKGROUND OF THE INVENTION

1. Field of the Invention

The present invention relates generally to a computer implemented method, data processing system, and computer program product for ordering accesses to blocks of data on a block storage device. More specifically, the present invention relates to selectively using an elevator sorting algorithm to reduce a central processing unit (CPU) processing load in some instances.

2. Description of the Related Art

Use of the elevator sorting algorithm can cause unwanted loads on a processor when sorting and inserting input/output (I/O) requests in a pending queue of a data processing system.

SUMMARY OF THE INVENTION

The present invention provides a computer implemented method and apparatus for queuing I/O requests to a pending queue. The I/O device driver sets a maximum ordered queue length for an I/O device driver coupled to a storage device then receives an I/O request from an application. The I/O device driver determines whether the pending queue is sorted and responds to a determination that the pending queue is sorted, determining if queued I/O requests exceed the maximum ordered queue length. Responding to a determination that the pending queue exceeds the maximum ordered queue length, the I/O device driver adds the I/O request based on a high pointer, and points the high pointer to the I/O request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is a flowchart of steps to add an I/O request to a pending queue in accordance with an illustrative embodiment of the invention;

FIG. 4B is a flowchart of steps to initialize a low pointer and/or a current pointer in accordance with an illustrative embodiment of the invention;

DETAILED DESCRIPTION OF THE PREFERRED EMBODIMENT

Figure 1:
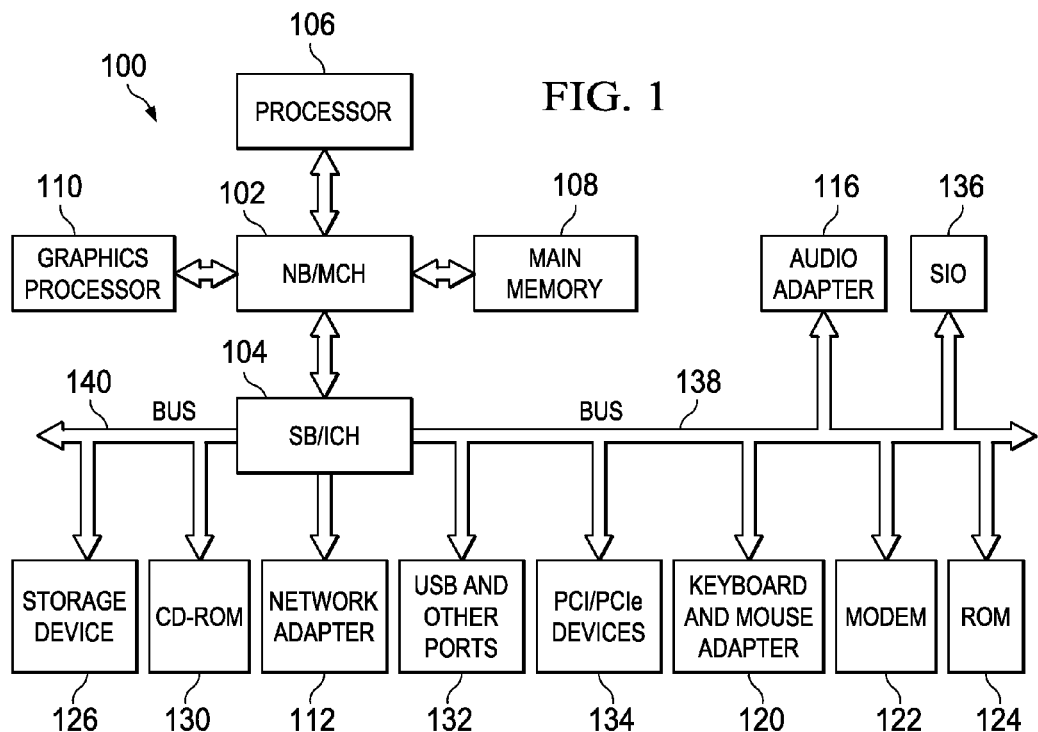
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, storage device 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Storage device 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as storage device 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. In addition, the functions and/or acts may transform articles, such as, for example, memory into a different state or thing by virtue of adding or removing electrons to portions of such circuits that form capacitors. Accordingly, such circuits may have physical states that correspond to zero or one or any other representation of data. Moreover, such circuit states may be used to cause particular machines to produce human-perceivable outputs, such as, for example, altering the transmission properties of a liquid crystal display (LCD) or controlling the operation of a sound transducer. It is appreciated that state is not limited solely to the placement of electrons, but that state can be changed based on altering the spin on one or more electrons.

The aspects of the illustrative embodiments provide a computer implemented method, data processing system, and computer program product for determining a pending queue reaching a predetermined length and adjusting to an unsorted addition of I/O requests in response thereto.

Figure 2:
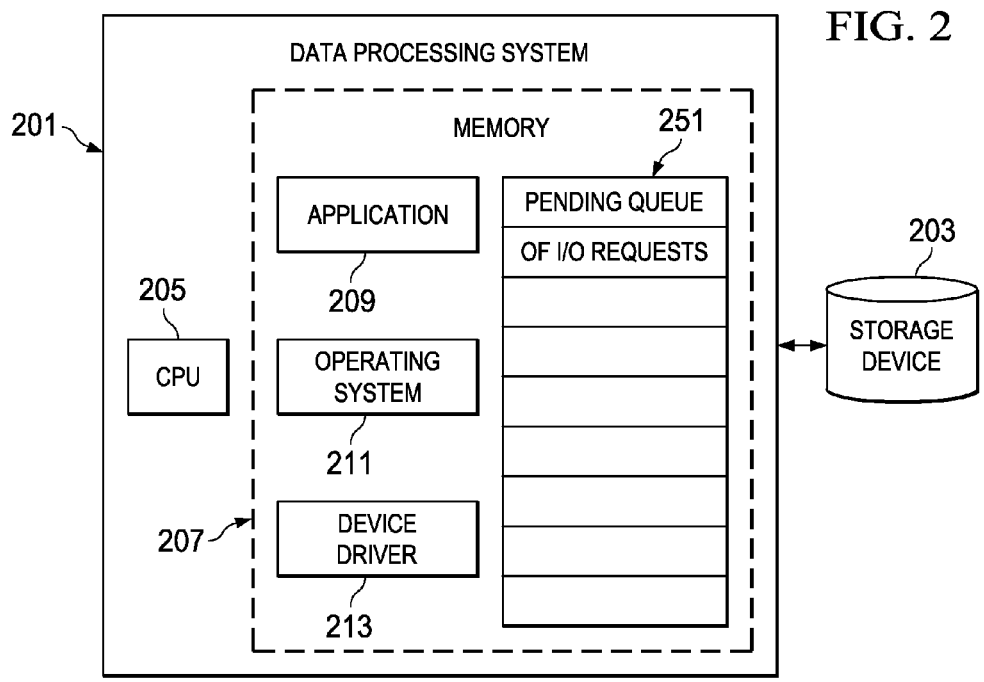
FIG. 2 shows an I/O device driver coupled to a storage device in accordance with an illustrative embodiment of the invention.

FIG. 2 shows an I/O device driver coupled to a storage device in accordance with an illustrative embodiment of the invention. Data processing system 201 hosts central processing unit (CPU) 205 as well as memory 207. Software components may be resident in memory 207. Software components may include application 209, operating system 211, and device driver 213, among others. An application is a software component that provides a service to a user. An application may include functions of an operating system.

I/O device driver 213 may be coupled to storage device 203. An I/O device driver accesses a block storage device, directly or indirectly, such that I/O requests made by application and/or an operating system may be serviced by accessing data stored in the block storage device. Device driver 213 may rely on pending queue of I/O requests 251. Storage device 203 has an internal memory configured to queue I/O requests in a queue. The queue has a queue depth, which may vary between 2 and 200, depending on the manufacturer. A queue depth is a maximum number of I/O requests that a storage device can queue simultaneously. A storage device is a block device that accesses data stored therein at least ten times slower than a slowest memory in a data processing system.

Storage device 203 may be, for example, storage device 126 of FIG. 1. Memory 207 may be, for example, main memory 108 of FIG. 1. CPU 206 may be, for example, processor 106 of FIG. 1.

A pending queue is a data structure that may be configured such that a processor may process each I/O request in sequence. The pending queue may contain one or more I/O requests, explained below. Accordingly, pending queue 251 may be formed, for example, as a linked list, an array, or any other data structure suitable for use as a queue.

Figure 3A:
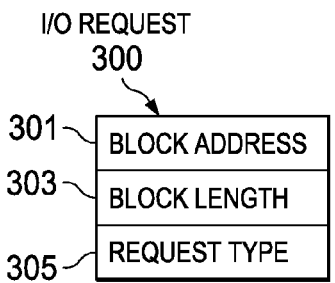
FIG. 3A is an I/O request in accordance with an illustrative embodiment of the invention.

FIG. 3A is an I/O request in accordance with an illustrative embodiment of the invention. I/O requests include at least a block address, a block length and a request type. Accordingly, I/O request 300 may include a block address 301, a block length 303, and a request type 305. A block address is an address that maps to a physical address for data that is stored to a media in a logical progression.

Figure 3B:
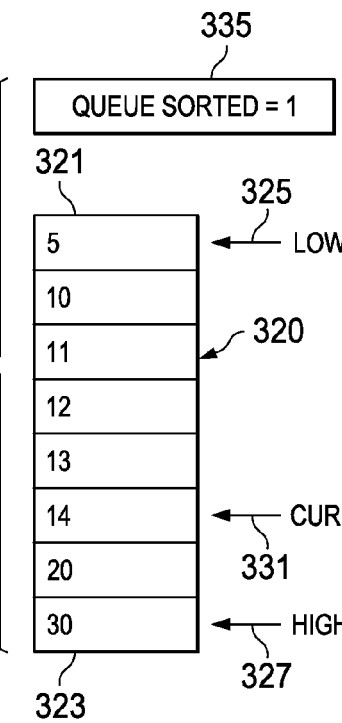
FIG. 3B is a pending queue that may not have reached the maximum ordered queue length since first adding an I/O request to the queue in accordance with an illustrative embodiment of the invention.

FIG. 3B is a pending queue in accordance with an illustrative embodiment of the invention. The pending queue has at least two ends. Each end may be a node in a linked list referenced by a pointer. The pending queue includes a maximum ordered queue length. A maximum ordered queue length is a threshold established that may be relative to an end of the pending queue, such as an end referenced by a 'low' pointer. The threshold can indicate a length of allowed queuing of I/O requests that may be achieved by relying on a processor to order I/O requests according to the block address of each I/O request. Accordingly, in response to exceeding the length, the processor may be configured to skip ordering I/O requests when adding each I/O request to the pending queue. During such times, the I/O device driver may append I/O requests to the pending queue in an ad hoc fashion.

The term 'low' with reference to a pointer are terms that are arbitrary and may, in some illustrative embodiments, pertain to either end of a pending queue. A low pointer may be used to select I/O requests for access when a pending queue is in an unsorted state.

FIG. 3B is a pending queue that may not have reached the maximum ordered queue length since first adding an I/O request to the queue in accordance with an illustrative embodiment of the invention. As such, the pending queue is arranged in an ordered manner, with I/O requests placed in consecutive order so that the block address of each successive I/O request is higher than the block address of an I/O request earlier in the queue. The maximum ordered queue length for queue 320 may be 8. Accordingly, newly added I/O requests may be inserted as needed to maintain an order of I/O blocks that may begin at I/O request 321, having a lowest block address, to I/O request 323 having a highest block address. In this example, a lowest block address among I/O requests is five (5) and the highest block address among I/O requests is 30. Each I/O request may be pointed to by 'low' pointer 325, and 'high' pointer 327, respectively. A current pointer may be used to select an I/O request for dispatch to a storage device for a next I/O request. Current pointer 331 may provide a processor a pointer to reference memory that stores the content of the selected I/O request. While the queue is ordered and a determination is made to keep the queue ordered, I/O requests are added and removed, for example, through the operation of the elevator sorting algorithm. Such an algorithm, operating on a processor, may, in some cases, search for a first I/O request that is smaller than a to-be-inserted I/O request's block address, and accordingly traverses the queue until a larger than the to-be-inserted I/O request is found. Once the larger block address is found, the to-be-inserted I/O request can be placed to precede the I/O request of the larger block address, but after the I/O request having a block address smaller than the to-be-inserted I/O request. Such an elevator sorting algorithm may be applied, in part, while instructions are performed on a processor, at step 417, explained below with reference to FIG. 4B.

I/O requests can be in two forms. A first form of I/O request is the I/O request as delivered to the device driver from the application. The second form of I/O request or queued I/O request is an I/O request as stored in the pending queue. The I/O request in the pending queue may include or otherwise be associated with a pointer that links to a second I/O request that is sequentially after the I/O request. Accordingly, the I/O request, when in the pending queue, may be a linked list element. A linked list element is a data structure that includes metadata to link or point to a second linked list element as well as a data field. The data field contains data that may be used by a software component that accesses the linked list. Linked list elements may be allocated when required. Similarly, a list element may be inserted between two existing list elements. A final element to a list may have a metadata that is a null pointer. A null pointer has a reserved value. The null pointer may be zero, indicating that the pointer refers to no object. Null is the reserved value. Accordingly, the pointer can be a value that references a memory location or to null. A referenced location is a memory address.

A low pointer may point to a head to a pending queue. The head may be a linked list element that points to a subsequent linked list element. A high pointer may point to a final element in a linked list or tail. Accordingly, such a linked list element may include a null pointer. A high pointer may point to a second to final element in a linked list or tail. An I/O device driver may periodically advance the high pointer from the second to final element to a final element in a linked list or tail.

Associated with pending queue 320 is sorted flag 335. A sorted flag is an indicator that indicates that an associated pending queue is made up of I/O requests that are ordered according to block addresses. For example, the pending queue can be filled with I/O requests that increase in block address as the pending queue is traversed beginning with the 'low' pointed I/O request. Conversely, an unset sorted flag indicates to a processor to skip ordering any new I/O requests received from an application. A pending queue associated with an unset sorted flag may have one or more I/O requests that have a block address smaller than that of a parent I/O request. In other words, a first linked list element that contains an I/O request may point to a subsequent list element that has a block address smaller than the first linked list element. Nevertheless, a pending queue that is associated with an unset sorted flag is not assured to have any linked list elements that fail to be ordered. In other words, each child element may have a block address that is higher than the block address of a parent element.

Figure 3C:
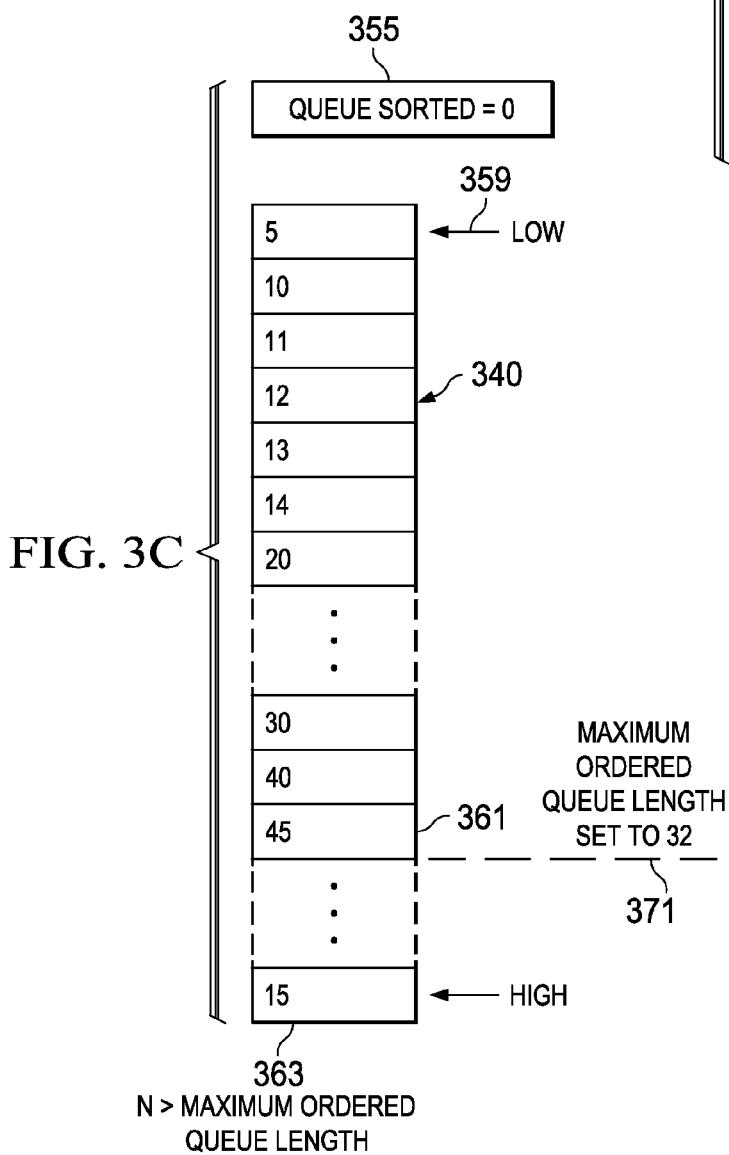
FIG. 3C is a pending queue that has reached the maximum ordered queue length since first adding an I/O request to the pending queue in accordance with an illustrative embodiment of the invention.

FIG. 3C is a pending queue that has reached the maximum ordered queue length since first adding an I/O request to the pending queue in accordance with an illustrative embodiment of the invention. Pending queue 340 is associated with sorted flag 355 that is unset. Accordingly, pending queue 340 is an unsorted pending queue. A maximum ordered queue length, for example, may be set to 32. Accordingly, a number of I/O requests in the pending queue may exceed the maximum ordered queue length. For example, I/O request 361 may be 32 elements deep into pending queue 340. Any added I/O requests beyond the $32^{nd}$ element, in this example, may be added without regard to the block address of the I/O request. For example, I/O request 363 may be an I/O request added to a queue at a linked list element beyond the depth set by the maximum ordered queue length. Thus, I/O request 363 may be offset a number, N, units deep into the pending queue with respect to the I/O request referenced by 'low' pointer 359. In this case, N is greater than the maximum ordered queue length. As a result, a processor may set sorted flag 355 to zero. Moreover, in response to an unset sorted flag, further additions of I/O requests to the pending queue may be made without regard to block address, even though the an added I/O request is added at a queue position less than the maximum ordered queue length. It is appreciated that a maximum ordered queue length of 32 may be threshold 371 that marks a displacement that is updated to account for I/O requests insertions or removals at random locations between 'low' pointer 359 and threshold 371. In other words, as I/O requests are added or removed, the threshold is a fixed distance or displacement from a 'low' pointer to the extent that a quantity of I/O requests in the pending queue is equal to or greater than the threshold.

FIG. 4A is a flowchart of steps to add an I/O request to a pending queue in accordance with an illustrative embodiment of the invention. Initially, an I/O device driver reads a queue depth of a storage device (step 401). I/O device driver may be I/O device driver 213 of FIG. 2. Storage device may be, for example, storage device 203 of FIG. 3. Next, I/O device driver may set a sorted flag to one (step 402). Next, I/O device driver may set a maximum ordered queue length (step 403). The I/O device driver may set the maximum ordered queue length based on a queue depth of the storage device, explained further with reference to FIG. 5, below. Next, I/O device driver may receive an I/O request (step 405). An I/O request may be received from an application in the manner explained above.

Next, the I/O device driver may determine if the pending queue is sorted (step 407). If the I/O device driver determines that the pending queue is not sorted processing continues at step 413. An I/O device driver may make this determination by determining if the sorted flag is set to zero, or otherwise indicates that the pending queue is not sorted.

Next, the I/O device driver may add the I/O request to a list location reached after a high pointer (step 413). Next, the I/O device driver may advance the 'high' pointer to reference the added I/O request (step 415). Processing may terminate thereafter.

If the determination at step 407 is positive, the I/O device driver may determine if the maximum ordered queue length is reached for the pending queue (step 409). If the maximum ordered queue length is reached for the pending queue, the I/O device driver may set the sorted flag to zero (step 411). Accordingly, the I/O device driver indicates that the list is unsorted, or at least, the processor may avoid processing normally used to order the newly received I/O request within the pending queue. The sorted flag may be set, for example, as shown in FIG. 3C. In the example of FIG. 3C, above, the pending queue is unsorted. By unsorted, it is meant that the pending queue is not guaranteed to contain an I/O request that is stored contrary to a sorting rule. Rather, by 'unsorted' it is meant that the processor is to avoid taking steps to assure that I/O requests that arrive while in the 'unsorted' state are to be placed in the pending queue between I/O requests to achieve the sorting rule.

Next, the I/O device driver may add the I/O request to a list location based on the 'high' pointer (step 413). 'Adding' may mean that the I/O device driver first creates an empty linked list element pointed to by a final linked list element, such as, for example, I/O request 323 of FIG. 3B. Alternatively, 'adding' may entail I/O request the empty linked list element being added to an end of an unsorted pending queue, such as, for example unsorted pending queue 340. Further, when 'adding' the I/O device driver may secondly place the information content of the received I/O within the empty linked list element. The location is may be a linked list element referenced by a pointer of the element referenced by the 'high' pointer. Next, the I/O device driver may advance the 'high' pointer to reference the added I/O request (step 415). Processing may terminate thereafter.

Conversely, if the maximum ordered queue length is not reached for the pending queue, the I/O device driver may insert the I/O request to the pending queue according to an elevator sorting algorithm (step 417). The elevator sorting algorithm is explained above, with reference to FIG. 3B. Processing may terminate thereafter.

FIG. 4B is a flowchart of steps to initialize a low pointer and/or a current pointer in accordance with an illustrative embodiment of the invention. The flowchart may be steps performed by the I/O device driver after the I/O device driver is first started, or following a transition of the pending queue from an unsorted or drained state to a sorted state. Initially, the I/O device driver may determine whether the pending queue is sorted (step 419). This step 419 may occur at about the same time of step 415 of FIG. 4A. In other words, the steps of initialization 418 may occur immediately before, during, or after step 415 points the 'high' pointer to point to the newly added I/O request. Next, the I/O device driver determines whether the pending queue holds fewer than two I/O requests (step 420). If the determination is affirmative for step 420, the I/O device driver may point the low pointer to the I/O request that is in the pending queue (step 421). Next, the I/O device driver may point the current pointer to the I/O request (step 423). Processing may terminate thereafter.

A negative determination at either steps 419 or 420 may cause the I/O device driver to complete the steps of initialization 418. By 'initialization' it is not meant that the flowchart of FIG. 4B operates only upon start-up of the I/O device driver. Nor does 'initialization' mean only that the steps of initialization 418 are performed only at initial program loading of a processor. Rather, initialization encompasses steps taken associated with a pending queue being restored to a sorted pending queue from zero or more transitions from being in an unsorted state.

Figure 4C:
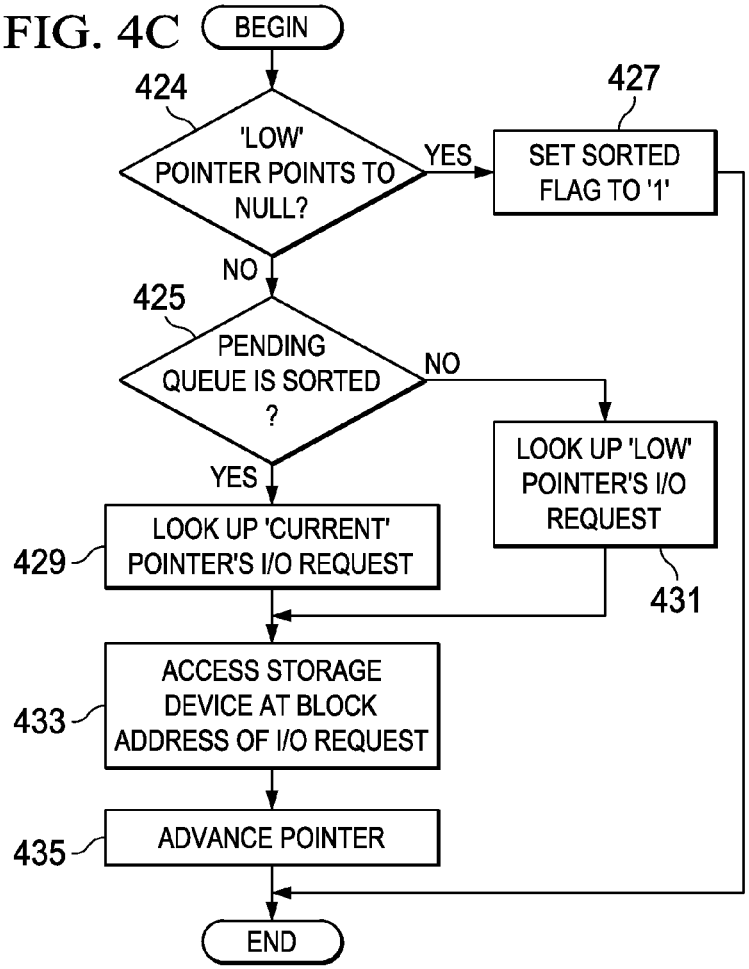
FIG. 4C is a flowchart of steps to access data referenced in an I/O request in accordance with an illustrative embodiment of the invention.

FIG. 4C is a flowchart of steps to access data referenced in an I/O request in accordance with an illustrative embodiment of the invention. Initially, a processor may determine if the pending queue is empty or drained. This state may exist when one or more pointers associated with the pending queue is null. For example, the I/O device driver may accomplish this step by determining whether the 'low' pointer is null (step 424). If the I/O device driver determines that the 'low' pointer, or other proxy, is null, I/O device driver may set the sorted flag to one (step 427). Processing may terminate thereafter.

However, if the I/O device driver determines that the pending queue is not empty, or makes a positive determination at step 424, the I/O device driver may determine if the pending queue is sorted (step 425). The I/O device driver may perform this step by determining if the sorted flag is set to one. Such a setting may indicate that the pending queue is sort. Providing the result to step 425 is positive, the I/O device driver may look up a 'current' pointer's I/O request (step 429). Otherwise, the I/O device driver may look up a 'low' pointer's I/O request (step 431).

Next, the I/O device driver may access the storage device at a block address of the I/O request (step 433). The I/O request is the I/O request referenced by either step 429 or 431. Next, the I/O device driver may advance the pointer (step 435). The pointer is, in the case of the positive branch from step 425, the 'current' pointer. On the other hand, the pointer is, in the case of the negative branch from step 431, the 'low' pointer. Accordingly, step 435 is the I/O device driver advancing the pointer selected based on the outcome to step 425.

Figure 5:
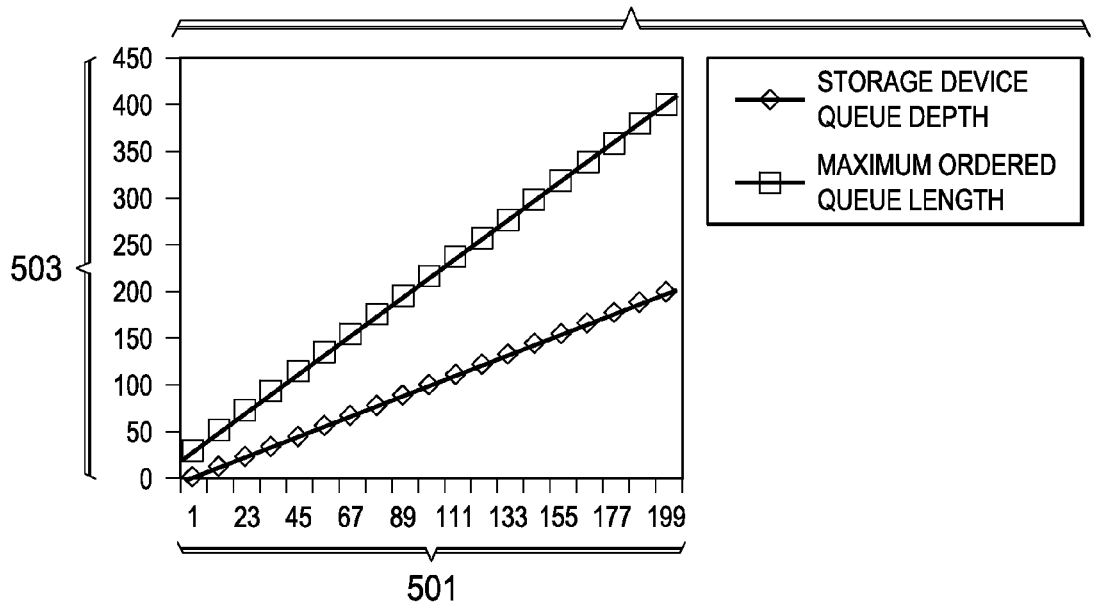
FIG. 5 is a diagram of a relation between a maximum ordered queue length and a storage device queue length in accordance with an illustrative embodiment of the invention.

FIG. 5 is a diagram of a relation between a maximum ordered queue length and a storage device queue length in accordance with an illustrative embodiment of the invention. For example, the I/O device driver may set a maximum ordered queue length based on a linear relationship of the storage device queue depth.

The illustrative embodiments permit a processing load of a processor to be reduced as compared to prior art I/O device driver designs. Accordingly, under conditions where a pending queue becomes excessively long, as compared to the maximum ordered queue length, illustrative embodiments of the invention may permit the processor to be devoted to other tasks than sorting I/O requests during intervals between discovery of overflow beyond the maximum ordered queue length and subsequent draining (or emptying) of the pending queue. Accordingly, as the storage device depth increases along the X-axis 501, the value set for the maximum ordered queue length, as depicted by the Y-axis 503, may increase. For example, a storage device having a queue depth of 200 may form a basis for setting the maximum ordered queue length to 400.

Alternatively, to using a specific function, an illustrative embodiment of the invention may obtain input from a system administrator to set a system tunable, which may be used, directly or indirectly to adjust the maximum ordered queue length. For example, the maximum ordered queue length may be obtained in a manner that, based on previous history of an I/O device driver, is calculated to cause the pending queue to be unsorted a minority of the time.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for queuing I/O requests to a pending queue, the method comprising:
    setting a maximum ordered queue length for an I/O device driver coupled to a storage device;
    receiving a first I/O request from an application, wherein the first I/O request comprises a first block address;
    determining whether the pending queue is sorted with regard to the first block address of the first I/O request;
    responsive to a determination that the pending queue is sorted, determining if queued I/O requests exceed the maximum ordered queue length;
    responsive to a determination that the pending queue exceeds the maximum ordered queue length, adding the first I/O request based on a high pointer; and
    pointing the high pointer to the first I/O request.

2. The computer implemented method of claim 1, further comprising:
    receiving a second I/O request, wherein the second I/O request comprises a second I/O block address;
    determining whether the pending queue is sorted;
    responsive to a determination that the pending queue is not sorted with regard to the second block address of the second I/O request, adding the second I/O request based on the high pointer; and
    pointing the high pointer to the second I/O request.

3. The computer implemented method of claim 2, wherein the second I/O block address is smaller than the first block address.

4. The computer implemented method of claim 1, further comprising:
    responsive to a determination that queued I/O requests exceed the maximum ordered queue length, setting a sorted flag to zero.

5. The computer implemented method of claim 1, wherein determining whether a pending queue is sorted further comprises determining whether a sorted flag is set.

6. The computer implemented method of claim 1, wherein pointing the high pointer further comprises:
    responsive to a determination that the pending queue is sorted, determining whether the pending queue holds fewer than two I/O requests; and
    responsive to a determination that the pending queue holds fewer than two I/O requests, pointing a low pointer and a current pointer to the first I/O request.

7. The computer implemented method of claim 1, further comprising:
    responsive to a determination that the queued I/O requests exceed the maximum ordered queue length, accessing another I/O request based on a low pointer.

8. The computer implemented method of claim 1, wherein adding the first I/O request further comprises:
    adding a linked list element as a referenced location of a linked list element pointed at by the high pointer; and
    storing the first I/O request in the linked list element.

9. The computer implemented method of claim 8, wherein the referenced location is an end of the pending queue.

10. A computer program product for queuing I/O requests to a pending queue, the computer program product comprising: a computer usable medium having computer usable program code embodied therewith, the computer program product comprising:
    computer usable program code configured to set a maximum ordered queue length for an I/O device driver coupled to a storage device;
    computer usable program code configured to receive an I/O request from an application, wherein the I/O request comprises a first block address;
    computer usable program code configured to determine whether the pending queue is sorted;
    computer usable program code configured to determine if queued I/O requests exceed the maximum ordered queue length, responsive to a determination that the pending queue is sorted with regard to the first block address of the I/O request;
    computer usable program code configured to add the I/O request based on a high pointer, responsive to a determination that the pending queue exceeds the maximum ordered queue length; and
    computer usable program code configured to point the high pointer to the I/O request.

11. The computer program product of claim 10, further comprising:
    computer usable program code configured to receive a second I/O request, wherein the second I/O request comprises a second I/O block address;
    computer usable program code configured to determine whether the pending queue is sorted;
    computer usable program code configured to add the second I/O request based on the high pointer, responsive to a determination that the pending queue is not sorted; and
    computer usable program code configured to point the high pointer to the second I/O request.

12. The computer program product of claim 11, wherein the second I/O block address is smaller than the first block address.

13. The computer program product of claim 10, further comprising:
    computer usable program code configured to set a sorted flag to zero, responsive to a determination that queued I/O requests exceed the maximum ordered queue length.

14. The computer program product of claim 10, wherein determining whether a pending queue is sorted further comprises determining whether a sorted flag is set.

* * * * *